(12) United States Patent
Witvoet et al.

(10) Patent No.: US 11,674,627 B2
(45) Date of Patent: Jun. 13, 2023

(54) COUPLING PART AND HOSE COUPLING PROVIDED THEREWITH, AND METHOD FOR COUPLING A HOSE

(71) Applicant: HYTRANS BEHEER B.V., Lemmer (NL)

(72) Inventors: Jan Johannes Witvoet, Leeuwarden (NL); Eelco Franciscus Zeinstra, Franeker (NL)

(73) Assignee: HYTRANS BEHEER B.V., Lemmer (NL)

( * ) Notice: Subject to any disclaimer, the term of this patent is extended or adjusted under 35 U.S.C. 154(b) by 121 days.

(21) Appl. No.: 17/044,891

(22) PCT Filed: Apr. 3, 2019

(86) PCT No.: PCT/NL2019/050201
§ 371 (c)(1),
(2) Date: Oct. 2, 2020

(87) PCT Pub. No.: WO2019/194675
PCT Pub. Date: Oct. 10, 2019

(65) Prior Publication Data
US 2021/0140574 A1 May 13, 2021

(30) Foreign Application Priority Data

Apr. 3, 2018 (DE) .......................... 2020180017108
Jun. 6, 2018 (NL) .................................... 2021068

(51) Int. Cl.
*F16L 37/252* (2006.01)
*F16L 37/113* (2006.01)

(52) U.S. Cl.
CPC ........... *F16L 37/252* (2013.01); *F16L 37/113* (2013.01)

(58) Field of Classification Search
CPC ..... F16L 37/107; F16L 37/113; F16L 37/248; F16L 37/252; F16L 37/098
(Continued)

(56) References Cited

U.S. PATENT DOCUMENTS 3,638,971 A * 2/1972 Smith ..................... F16L 37/10
                                                    285/352
5,658,159 A * 8/1997 Gardner ................ F16L 37/113
(Continued)

FOREIGN PATENT DOCUMENTS

DE         1810141 U    4/1960
DE         9301096 U1   3/1993
(Continued)

OTHER PUBLICATIONS

International Search Report and Written Opinion for International Patent Application No. PCT/NL2019/050201, dated Jul. 31, 2019, 9 pages.

*Primary Examiner* — Zachary T Dragicevich
(74) *Attorney, Agent, or Firm* — KDW Firm PLLC

(57) ABSTRACT

A coupling part for a hose coupling, a hose coupling provided therewith and method for coupling a hose or hose part. The coupling part includes an annular element; a number of hook-like coupling elements arranged at or on the annular element and configured to engage on a corresponding coupling element of a corresponding coupling part for the purpose of forming a coupling; and a wall surface provided on the inward directed side of the hook-like coupling element and provided at an angle of chamfer to the main throughflow direction of the coupling part.

15 Claims, 3 Drawing Sheets

(58) Field of Classification Search
USPC ........................................ 285/352, 401, 402
See application file for complete search history.

(56) References Cited

U.S. PATENT DOCUMENTS

| | | | | |
|---|---|---|---|---|
| 6,382,680 | B1* | 5/2002 | Horimoto ............. | F16L 37/252 |
| | | | | 285/352 |
| 2003/0184091 | A1* | 10/2003 | Ricard ................. | F16L 37/113 |
| | | | | 285/401 |
| 2009/0184518 | A1* | 7/2009 | Nakamura ............ | F16L 37/113 |
| | | | | 285/401 |
| 2017/0138521 | A1* | 5/2017 | Horimoto ............. | F16L 37/252 |
| 2018/0320809 | A1* | 11/2018 | Kawasaki ............. | F16L 37/252 |
| 2019/0186664 | A1* | 6/2019 | Miller ................... | F16L 37/098 |

FOREIGN PATENT DOCUMENTS

| | | |
|---|---|---|
| DE | 29803438 U1 | 5/1998 |
| DE | 20214463 U1 | 1/2003 |
| JP | 2011085263 A | 4/2011 |

\* cited by examiner

COUPLING PART AND HOSE COUPLING PROVIDED THEREWITH, AND METHOD FOR COUPLING A HOSE

CROSS-REFERENCE TO RELATED APPLICATIONS

This is a national stage application filed under 35 U.S.C. § 371 of pending international application PCT/NL2019/050201, filed Apr. 3, 2019, which claims priority to German Patent Application No. DE2020180017108, filed Apr. 3, 2018, and Netherlands Patent Application No. NL 2021068, filed Jun. 6, 2018, the entirety of which applications are hereby incorporated by reference herein.

FIELD OF THE DISCLOSURE

The invention relates to a coupling part for a hose coupling, such as a hose coupling for fire hoses.

BACKGROUND

Known in practice are diverse couplings wherein use is made of coupling parts whereby hoses or hose parts, particularly fire hoses, can be coupled. The hoses or hose parts are hereby coupled to each other or to other points, such as a connecting point, coupling piece, manifold and the like. Such coupling parts usually make use of a toothing or series of hook-like elements which are embodied such that they can be brought into engagement with corresponding elements of another coupling part.

A problem with such known coupling means for coupling hoses is that these coupling parts are difficult to position during coupling and/or uncoupling of coupling parts of a hose coupling. This is particularly important if the coupling is used in the case of calamities, such as fire. It thus for instance occurs in practice that during releasing of such a hose coupling a coupling part is pulled out of alignment with the other coupling part. This makes it more difficult, or even impossible, to uncouple the coupling parts from each other. This means that extra effort is required in order to uncouple the coupling parts.

It is therefore an object of the present invention to provide a coupling part which obviates or at least reduces the above stated problems.

SUMMARY

The invention provides for this purpose a coupling part suitable for coupling a hose or hose part, the coupling part according to the invention comprising:
- an annular element;
- a number of hook-like coupling elements arranged at or on the annular element and configured to engage on a corresponding coupling element of a corresponding coupling part for the purpose of forming a coupling; and
- a wall surface provided on the inward directed side of the hook-like coupling element and provided at an angle of chamfer to the main throughflow direction of the coupling part.

Hose parts can relate to diverse types of hose or hose part, also understood to mean tubes and pipes. The coupling part according to the invention is particularly suitable for coupling so-called fire hoses or fire hose parts.

The annular element provides stability for the coupling part on which a number of hook-like coupling elements are provided. The dimensions of the annular element are adapted to the type of hose or hose part. The hook-like elements are configured such that they can be brought into engagement with corresponding hook-like elements of a corresponding coupling part when a coupling is being realized. In a currently preferred embodiment the hook-like elements are provided integrally with the annular element, preferably provided from a single piece.

According to the invention, the hook-like coupling element is provided on the inward directed side with a wall surface. This wall surface is provided at an angle of chamfer to the main throughflow direction of the coupling part. The wall surface partially follows the periphery or contour of the annular element. Providing the wall surface at an angle of chamfer simplifies the coupling, and particularly uncoupling, of two coupled coupling parts. It has been found that it is particularly during uncoupling of coupling parts that they are often pulled out of alignment to some extent in practice. This results in mutual clamping of two coupling parts of a coupling such that they cannot be uncoupled effectively, or even cannot be uncoupled at all, without further effort. This impedes release of a coupling. If the hose is filled (for instance with water) this becomes even more difficult. It has been found that by providing the angle of chamfer this misalignment can be prevented in effective manner, or can at least be reduced such that a coupling part which can be utilized effectively is obtained in practice.

The angle of chamfer preferably lies in the range of 2-25°, preferably in the range of 5-20°, and the angle of chamfer most preferably amounts to about 15°. It has been found that, with such an angle of chamfer, misalignment of the coupling parts can be prevented in effective manner. A coupling part which can be utilized in effective and user-friendly manner is hereby provided.

A particular further advantage of the coupling part according to the invention is the weight reduction which can be realized relative to conventional couplings. For similar couplings, a conventional Storz coupling has a weight of about 11 kg and a similar coupling with coupling parts according to the invention a weight of about 4 to 5 kg. This makes the coupling according to the invention which can be realized much more user-friendly and additionally contributes in situations to a faster coupling and/or uncoupling.

In a preferred embodiment according to the invention the coupling part further comprises a locating surface provided on the hook-like coupling element and directed substantially in the peripheral direction of the annular element, wherein the locating surface is provided at a locating angle to the main throughflow direction of the coupling part.

Providing the hook-like coupling element according to the invention with a so-called locating surface at a locating angle to the main throughflow direction of the coupling part provides a locating or aligning function of the hook-like coupling elements. Such a locating or aligning function is thereby also provided for the coupling part as such. A coupling part can hereby be coupled in effective manner to a corresponding coupling part with no appreciable reduction in the strength of the coupling. The advantage of applying such a locating angle is that a coupling can be brought about more quickly. This is particularly advantageous in the case of a calamity, such as a fire, wherein couplings must be realized quickly and efficiently in order to be able to combat such a fire.

The locating angle preferably lies in the range of 2-20°, more preferably in the range of 5-15°, and the locating angle most preferably amounts to about 10°. It has been found that such an angle provides an aligning or locating function in effective manner.

In an advantageous embodiment according to the invention the coupling part comprises a locking element configured to lock an arranged corresponding coupling part.

By providing a locking element undesired uncoupling of two coupled coupling parts is avoided.

The locking element is preferably provided with a spring or similar spring element. The spring is preferably configured such that when two coupling parts are being coupled, they can be moved toward each other and herein for instance press away the locking element with the spring. Rotation through the coupling angle of for instance 5-15° in the peripheral direction of the annular element releases the locking element again, and it will be moved to the blocking position by the spring. This blocks undesired rotating back. Uncoupling of the coupling parts is then possible by pressing in the spring or the spring element again and enabling the uncoupling by rotation back through the coupling angle. An effective and robust coupling is hereby provided.

In an advantageous embodiment according to the invention the coupling part comprises at least six and preferably at least eight hook-like coupling elements.

It has been found that by providing at least six coupling elements a suitable coupling can be provided in effective manner. The number of coupling elements is preferably adapted to the diameter of the annular element. It will be apparent that a different number of coupling elements is also possible.

The invention further relates to a hose coupling for coupling a hose or hose part, the coupling comprising at least two coupling parts according to the invention.

Such a hose coupling provides the same or similar advantages and effects as described for the coupling part according to the invention.

The hose coupling according to the invention can be used for coupling a hose to an adapter, pipe, connecting piece, and so on, and also for coupling two separate hose parts to each other. In addition, it is also possible to connect a plurality of hoses or hose parts with separate couplings to for instance a coupling piece.

The invention further also relates to a method for coupling a hose or hose part, comprising the steps of:
providing at least two coupling parts according to an embodiment of the invention; and
coupling the coupling parts.

The method provides the same effects and advantages as described for the coupling part and/or hose coupling.

BRIEF DESCRIPTION OF THE DRAWINGS

Further advantages, features and details of the invention are elucidated on the basis of preferred embodiments thereof, wherein reference is made to the accompanying drawings, in which.

DETAILED DESCRIPTION

Figure 1A:
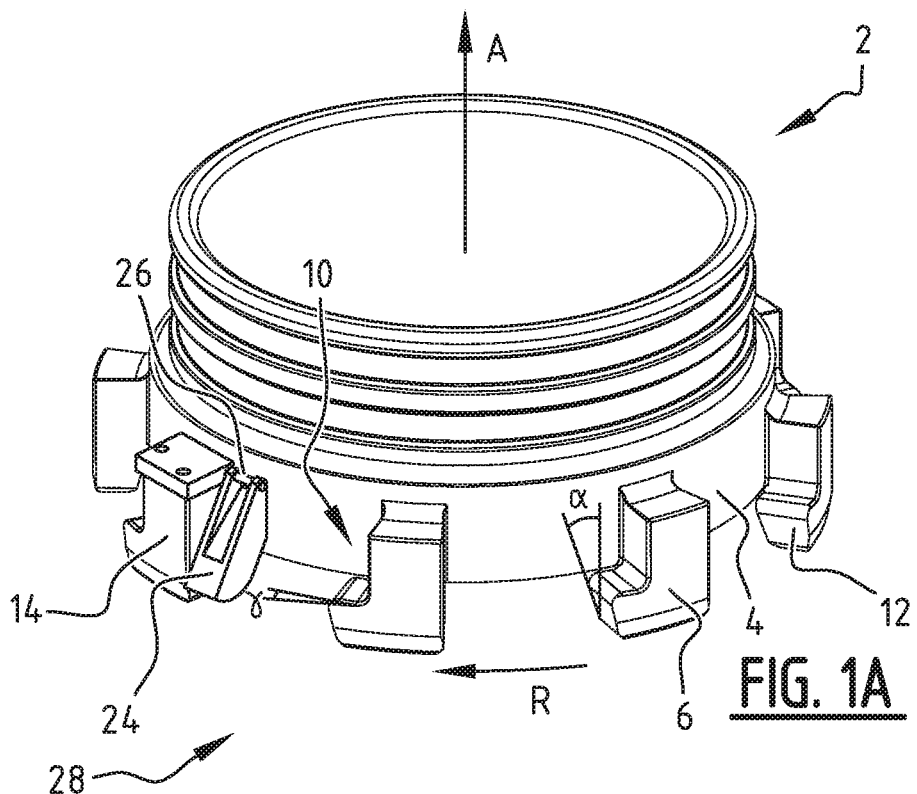
FIGS. 1A-1B are views of two corresponding coupling parts for a hose coupling according to the invention.
Figure 1B:
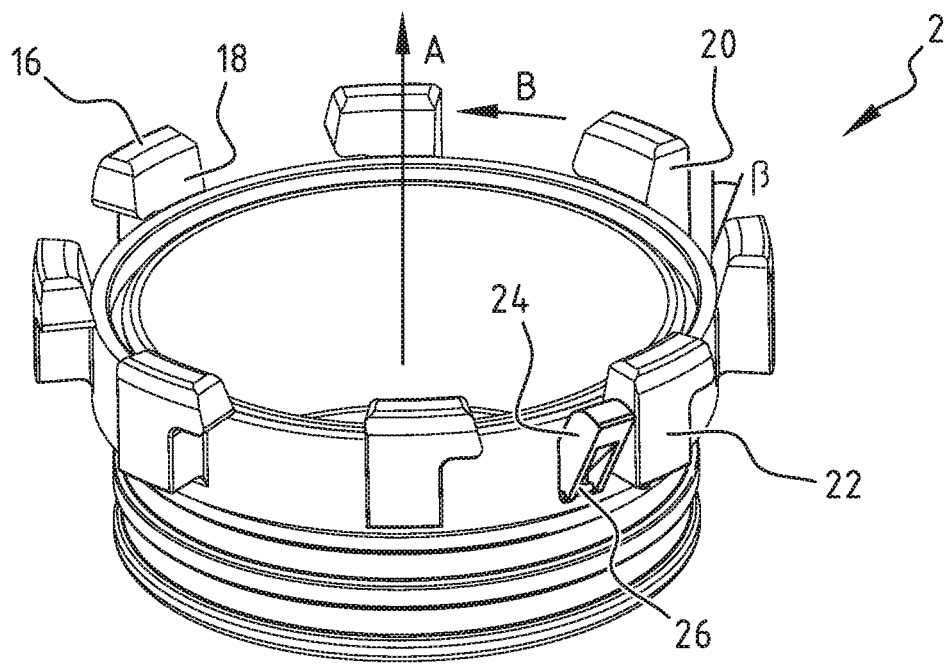

Coupling part 2 is provided with annular element 4 on which a number of hook-like coupling elements 6 (FIGS. 1A-1B) are arranged. In the shown embodiment coupling part 2 is provided with eight coupling elements 6. Each individual coupling element 6 is provided with hook 10, locating surface 12, outer surface 14, end surface 16, contact surface 17, and a chamfered surface or wall surface 18. Further provided are rear surface 20 and outer surface 22.

In use, flow occurs through coupling part 2 in throughflow direction A or conversely in opposite direction. In the shown embodiment locating surface 12 is provided at a locating angle $\alpha$ to throughflow direction A. In the shown embodiment chamfered surface 18 is further provided at an angle of chamfer $\beta$ relative to throughflow direction A. In the shown embodiment the locating angle $\alpha$ is about 10° and angle of chamfer $\beta$ is about 15°. It will be apparent that application of other angles is likewise possible according to the invention. It is thus for instance possible to dispense with a locating angle $\alpha$, i.e. to apply a locating angle of about 0°.

Further provided is locking element 24. In the shown embodiment locking element 24 is provided with spring element 26.

If two individual coupling parts 2 are moved toward each other in throughflow direction A for the purpose of coupling the coupling parts 2, one of eight coupling elements 6 will push locking element 24 radially outward in the shown embodiment. After rotation in coupling direction B, relative to corresponding coupling part 2, locking element 24 will be released and spring back to a free position, and thereby prevent rotation back in opposite rotation direction of coupling direction B. A coupling 28 which can be realized in effective manner is hereby provided from two coupling parts 2.

For the purpose of uncoupling the coupling 28, locking element 24 is moved out of the free position again, after which a rotation in opposite coupling direction B can be performed through a coupling angle of about 5-30°, so that uncoupling of two coupling parts 2 is possible. Owing to the locating angle $\alpha$ and angle of chamfer $\beta$, coupling parts 2 can be moved relatively easily relative to each other, and an efficient uncoupling is for instance possible.

Figure 2A:
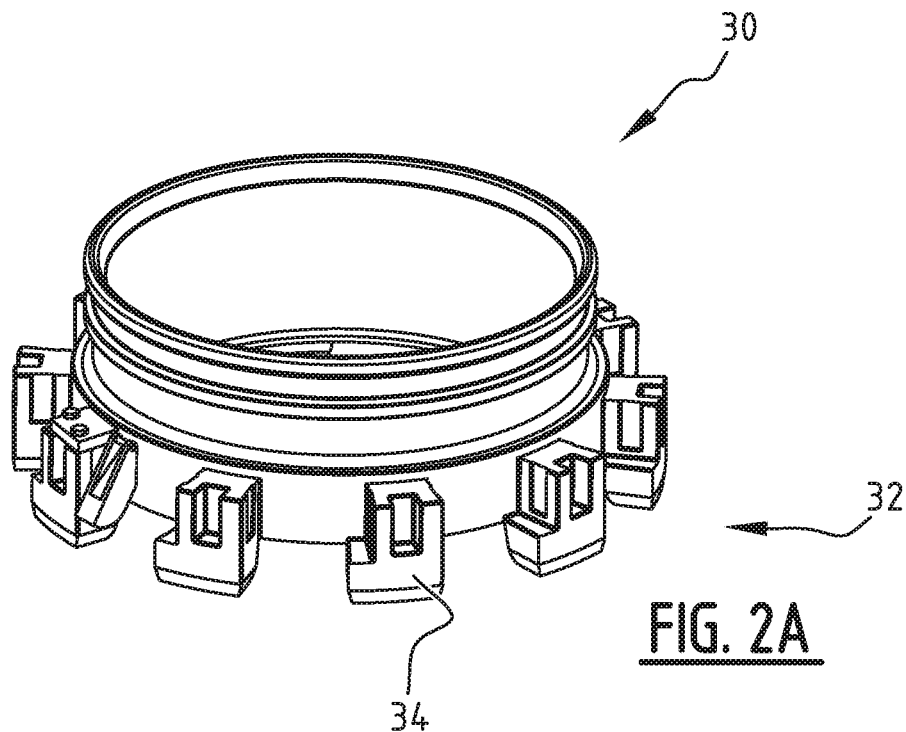
FIGS. 2A-2B are views of an alternative embodiment of two coupling parts for the hose coupling according to the invention.
Figure 2B:
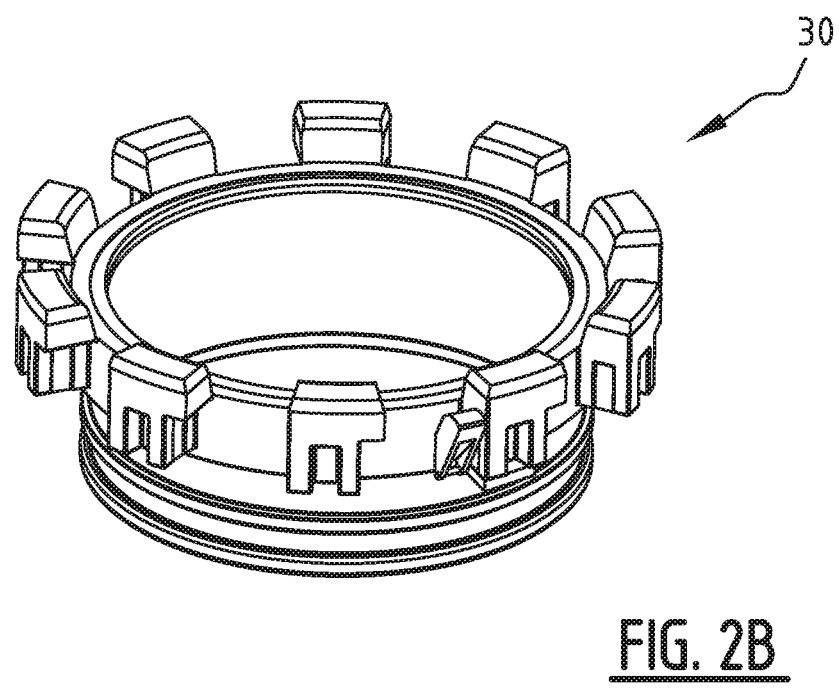

Alternative coupling part 30 (FIGS. 2A-2B) enables hose coupling 32. Coupling part 30 is particularly suitable for larger hose diameters and in the shown embodiment is provided with ten coupling elements 34. Coupling part 30 is otherwise provided with the same elements and the same operation as the above described coupling part 2.

Figure 3A:
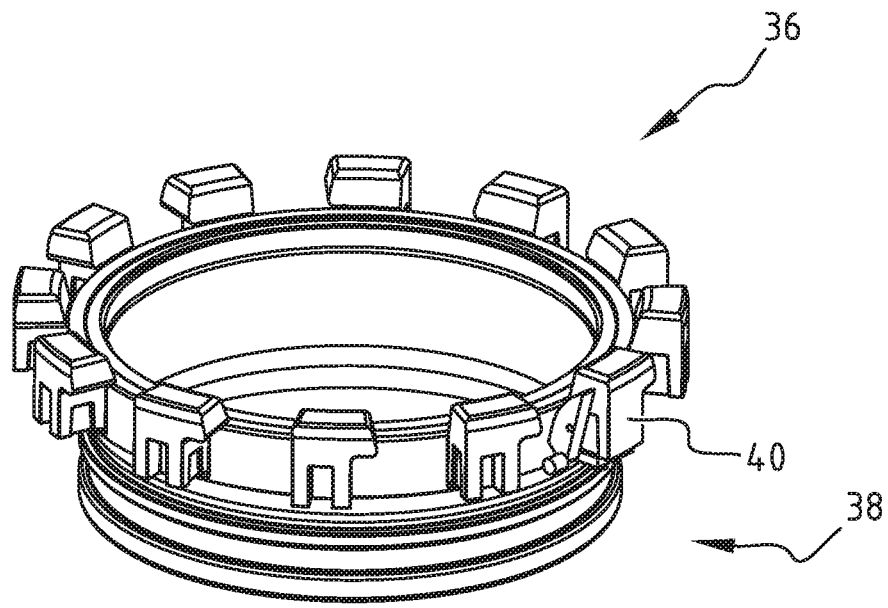
FIGS. 3A-3B are views of further alternative coupling parts of a coupling according to the invention.
Figure 3B:
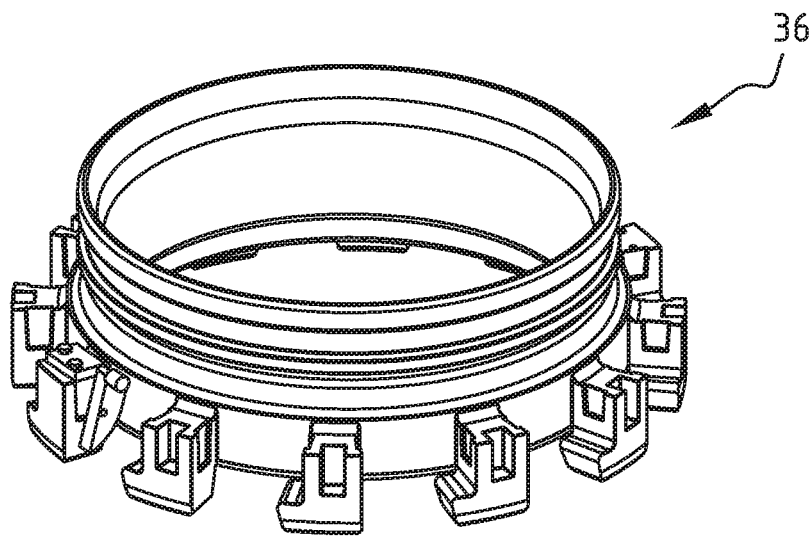

A further alternative coupling part 36 (FIGS. 3A-3B) enables coupling 38. Coupling part 36 is particularly suitable for even larger hose diameters. In this embodiment coupling part 36 is provided with twelve hook-like coupling elements 40. The operation of coupling part 36 for realizing coupling 38 is the same as that described for the above shown coupling parts 2, 30.

In a currently preferred embodiment contact surface 17 is provided at angle $\gamma$ to the throughflow surface at right angles to throughflow direction A. Coupling 28, 32, 38 can hereby be realized with some force, such that a robust coupling is obtained in practice. It is further possible to provide an additional sealing ring in conventional manner (not shown). Hook-like coupling elements 6, 34, 40 are preferably provided integrally with ring 4.

The present invention is by no means limited to the above described preferred embodiments thereof. The rights sought are defined by the following claims, within the scope of which many modifications can be envisaged. It is thus for instance possible to provide a number of hook-like coupling elements 6, 34, 40 other than the shown eight, ten or twelve. The number of hook-like coupling elements 6, 34, 40 is preferably adapted to the diameter of annular element 4. Coupling elements 2, 30, 36 can be provided from aluminium or another suitable material.

The invention claimed is:

1. A coupling part for a hose coupling, comprising:
   an annular element;
   a number of coupling elements arranged at or on the annular element and configured to engage on a corresponding coupling element of a corresponding coupling part for the purpose of forming a coupling, the coupling elements being shaped like a hook;
   a wall surface provided on the inward directed side of the coupling element, wherein an entirety of the wall surface is provided at an angle of chamfer to the main throughflow direction of the coupling part, and wherein the wall surface partially follows the contour of the annular element; and
   a locking element configured to lock an arranged corresponding coupling part, wherein the locking element is provided with a spring.

2. The coupling part according to claim 1, wherein the angle of chamfer lies in the range of 2° to 25°.

3. The coupling part according to claim 1, further comprising a locating surface provided on the coupling element and directed substantially in the peripheral direction of the annular element, wherein the locating surface is provided at a locating angle to the main throughflow direction of the coupling part.

4. The coupling part according to claim 3, wherein the locating angle lies in the range of 2° to 20°.

5. The coupling part according to claim 3, wherein the locating angle is in the range of 5° to 15°.

6. The coupling part according to claim 3, wherein the locating angle is about 10°.

7. The coupling part according to claim 3, wherein the locating surface is provided at the location angle.

8. The coupling part according to claim 2, further comprising a locating surface provided on the coupling element and directed substantially in the peripheral direction of the annular element, wherein the locating surface is provided at a locating angle to the main throughflow direction of the coupling part, wherein the locating angle is in the range of 2° to 20°.

9. The coupling part according to claim 8, wherein the locating surface is provided at the location angle.

10. The coupling part according to claim 1, comprising at least six coupling elements.

11. The coupling part according to claim 1, wherein the angle of chamfer is in the range of 5° to 20°.

12. The coupling part according to claim 1, wherein the angle of chamfer is about 15°.

13. The coupling part according to claim 1, comprising at least eight coupling elements.

14. A hose coupling for coupling a hose or hose part, the coupling comprising two coupling parts, wherein each coupling part comprises:
    an annular element;
    a number of coupling elements arranged at or on the annular element and configured to engage on a corresponding coupling element of a corresponding coupling part for the purpose of forming a coupling, the coupling elements being shaped like a hook; and
    a wall surface provided on the inward directed side of the coupling element, wherein an entirety of the wall surface is provided at an angle of chamfer to the main throughflow direction of the coupling part, and wherein the wall surface partially follows the contour of the annular element; and
    a locking element configured to lock an arranged corresponding coupling part, wherein the locking element is provided with a spring.

15. A method for coupling a hose or hose part, comprising the steps of:
    providing at least two coupling parts, wherein each coupling part comprises:
      an annular element;
      a number of coupling elements arranged at or on the annular element and configured to engage on a corresponding coupling element of a corresponding coupling part for the purpose of forming a coupling, the coupling elements being shaped like a hook; and
      a wall surface provided on the inward directed side of the coupling element, wherein an entirety of the wall surface is provided at an angle of chamfer to the main throughflow direction of the coupling part, and wherein the wall surface partially follows the contour of the annular element; and
    coupling the coupling parts.

* * * * *